United States Patent
Tökés et al.

(10) Patent No.: US 8,018,131 B2
(45) Date of Patent: Sep. 13, 2011

(54) BULB-SHAPED OUTER ENVELOPE FOR LAMPS, METHOD FOR MANUFACTURE THEREOF, AND COMPACT FLUORESCENT LAMP THEREWITH

(75) Inventors: József Tökés, Erdőkertes (HU); István Würsching, Budapest (HU); József Fülöp, Budapest (HU); László Bánkuti, Budapest (HU)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 11/946,665

(22) Filed: Nov. 28, 2007

(65) Prior Publication Data
US 2008/0278057 A1    Nov. 13, 2008

(30) Foreign Application Priority Data
May 11, 2007    (HU) .................................... 0700336

(51) Int. Cl.
*H01J 5/02*    (2006.01)
(52) U.S. Cl. .................. 313/493; 313/634; 313/573
(58) Field of Classification Search .................. 313/493, 313/51, 624, 625, 634, 573, 317, 318.01–318.12
See application file for complete search history.

(56) References Cited

U.S. PATENT DOCUMENTS

| | | | |
|---|---|---|---|
| 4,527,089 A | 7/1985 | Bouchard et al. | |
| 4,600,856 A | 7/1986 | Bouchard et al. | |
| 4,728,849 A * | 3/1988 | Morris et al. | 313/113 |
| 5,539,271 A * | 7/1996 | Sulcs et al. | 313/25 |
| 6,064,155 A | 5/2000 | Maya et al. | |
| 0,087,258 A1 | 4/2006 | Kubota et al. | |
| 7,053,554 B2 * | 5/2006 | Yasuda et al. | 313/634 |
| 0,063,656 A1 | 3/2007 | Wursching et al. | |

FOREIGN PATENT DOCUMENTS

| | | |
|---|---|---|
| GB | 405525 | 2/1934 |
| JP | 360003848 A * | 1/1985 |

OTHER PUBLICATIONS

PCT/US2008/079302, International Search Report, mailed Mar. 3, 2009.

* cited by examiner

*Primary Examiner* — Toan Ton
*Assistant Examiner* — Fatima Farokhrooz
(74) *Attorney, Agent, or Firm* — Fay Sharpe LLP (57) ABSTRACT

A bulb-shaped outer envelope for accommodating at least one lamp including a light-emitting body and a control gear is disclosed. The envelope has a substantially spherical section for receiving the light-emitting body, and an elongated end section for receiving at least a part of the control gear components. The elongated end section is provided with a neck section. A substantially tubular neck-extension portion connects to an inner surface portion of and protruding from the neck section. The neck-extension portion is suitable for accommodating a remaining part of the control gear components. In a method for the manufacture of a glass outer envelope, a flare that is normally used in the manufacture of incandescent lamps is turned around by 180°, put into a skirted bulbous envelope, melted into the envelope while the skirt is detached and the flare is formed into a neck-extension portion. A self-ballasted compact fluorescent lamp with the bulb-shaped outer envelope is also disclosed. A part of the ballast components are disposed in the neck-extension portion of the outer envelope.

21 Claims, 10 Drawing Sheets

BULB-SHAPED OUTER ENVELOPE FOR LAMPS, METHOD FOR MANUFACTURE THEREOF, AND COMPACT FLUORESCENT LAMP THEREWITH

FIELD OF THE INVENTION

This invention relates to a bulb-shaped outer envelope for lamps and a method of manufacture of bulb-shaped outer envelopes. It also relates to compact fluorescent lamps provided with the bulb-shaped outer envelope.

BACKGROUND OF THE INVENTION

Outer envelopes with insert lamps have wide household and industrial application. The outer envelopes protect the insert lamps from harmful outside effects and impacts, make the light of the insert lamp diffuse and more uniform when their surface is suitable formed, and lend the light source an advantageous aesthetical appearance. The outer envelopes are also used with compact fluorescent lamps. Most recently, compact fluorescent lamps retrofits for an incandescent lamp have been designed. These lamps are provided with bulb-shaped outer envelope that has dimensions close to those of incandescent lamps, and imitate an aesthetic appearance of incandescent lamps.

U.S. Pat. No. 4,527,089 discloses a compact fluorescent lamp comprising multiple, individual tubes mechanically formed into an assembly and inserted into an outer envelope. The individual open-ended tubes are connected to each other through an arc directing means to form a continuous arc path. The outer envelope has a cylindrical shape, is sealed and includes an arc generating and sustaining medium such as an atmosphere of mercury and argon. The electric wires of the fluorescent lamp as lead-in wires are led through a flare that serves as a sealing element of the cylindrical outer envelope. The ballast circuit providing energy for the fluorescent lamp is situated outside the outer envelope and therefore it requires special contact elements and arrangement.

U.S. Pat. No. 4,600,856 describes a compact low-pressure arc discharge lamp with multiple tubes frictionally fitted into apertures in a base plate. The base plate is held in a fixed position inside the sealed outer envelope but there is no built in ballast in the outer envelope or bulb. A CFL of such a construction has to be connected to outer ballast, which requires external electric connections and a special connection means to connect the ballast to a power supply.

U.S. Pat. No. 6,064,155 discloses a fluorescent lamp with an outer envelope having an external shape of an incandescent lamp on a standard Edison-type base. The discharge tube is wound in a coil around the axis of the envelope and is disposed within the outer envelope. Ballast is also disposed within the outer envelope. A heat shield is disposed between the lamp and the ballast to thermally isolate the lamp from the ballast, whereby heat from the lamp will not adversely affect the ballast. Although this lamp is provided with integrated ballast inside the outer envelope, it is not disclosed and therefore it is not clear from this document how the lamp and the ballast circuit components are positioned inside the relatively small inner space of the outer envelope and how the electrical connection between the lamp electrodes and the ballast circuit or between the ballast circuit and the base is established.

There is a need for bulb-shaped outer envelopes that provide sufficient space for lamps and components of the control gear of lamps while preserve the size of the envelope of usual incandescent lamps. Similarly, there is a need for a self-ballasted compact fluorescent lamp that has a bulb-shaped outer envelope, can replace usual incandescent lamps, can be manufactured easily, and has high lumen output and relatively small size.

SUMMARY OF THE INVENTION

In an exemplary embodiment of the present invention, there is provided a bulb-shaped outer envelope for accommodating at least one lamp including a light-emitting body and a control gear with components. The envelope has a substantially spherical section for receiving the light-emitting body, an elongated end section for receiving at least a part of the components of the control gear. The elongated end section is provided with a neck section. The envelope also comprises a substantially tubular neck-extension portion connecting to an inner surface portion of and protruding from the neck section. The substantially tubular neck-extension portion is suitable for accommodating at least a remaining part of the components of the control gear and reinforcing the neck section.

In an exemplary embodiment of another aspect of this invention, a method for substantially vertical manufacture of a bulb-shaped glass outer envelope for a lamp with a base is provided. The outer envelope has a principal axis and includes a neck section and a neck extension portion. The method comprises the following steps:

a/ providing a bulb-shaped envelope with a skirt section, the skirt section facing downward;

b/ providing a flare with a tubular section and a flanged section;

c/ heating the neck section of the envelope with a flame; while d/ lifting the flare through the skirt section into the neck section in a position substantially perpendicular to the principal axis and in which the tubular section of the flare faces downward;

e/ melting the glass of the neck section until the skirt section drops, and an end portion of the envelope melts onto the flanged section of the flare;

f/ closing a mold around the flare and at least a portion of the neck section, the mold having an inner surface suitable for forming a desired shape of the neck section and the flare;

g/ blowing a gas through the neck-extension portion into the envelope for making an overpressure within the envelope, while removing the flame of heating, so that the melted glass of the envelope fills out the mold and subsequently cools down;

h/ removing the mold;

i/ annealing the glass of the envelope.

In an exemplary embodiment of a further aspect of this invention, there is provided a compact fluorescent lamp comprising a discharge tube arrangement. The discharge tube arrangement is formed of at least one discharge tube and encloses a discharge volume filled with a discharge gas. A fluorescent phosphor coat is disposed on the inner surface of the tube. The tube contains a continuous arc path and has electrodes at each end of this path. The lamp also comprises a ballast circuit for controlling current in the tube and is connected to the electrodes and an associated power supply, as well as a bulb-shaped outer envelope. Said envelope comprises a substantially spherical section enclosing the discharge tube arrangement; and an elongated end section enclosing at least a part of the ballast circuit components, the elongated end section having a substantially cylindrical neck section provided with an outer surface suitable for receiving and fixing a base;

a substantially tubular neck-extension portion connecting to an inner surface portion of and protruding from the neck section, and providing space for accommodating at least a remaining part of the ballast circuit components.

This invention has a number of significant advantages over the prior art. Due to the neck-extension portion, a larger space is provided for the components of a control gear within the envelope. The control gear can be built of a large number of components; it may for example be a combination of fluorescent ballast and control circuits for other type of lamps. On the other hand, the overall lamp size can also be reduced due to the better exploitation of the space within the outer envelope with respect to a given lumen output. The neck-extension portion can also provide for insulation of components of the control gear from the metal base. A further significant advantage is that a line of manufacture of incandescent lamps can for example be easily adapted to manufacturing bulb-shaped outer envelopes with neck-extension portions.

BRIEF DESCRIPTION OF THE DRAWINGS

This invention will now be described in detail with reference to enclosed drawings, in which.

DETAILED DESCRIPTION OF THE INVENTION

Figure 1:
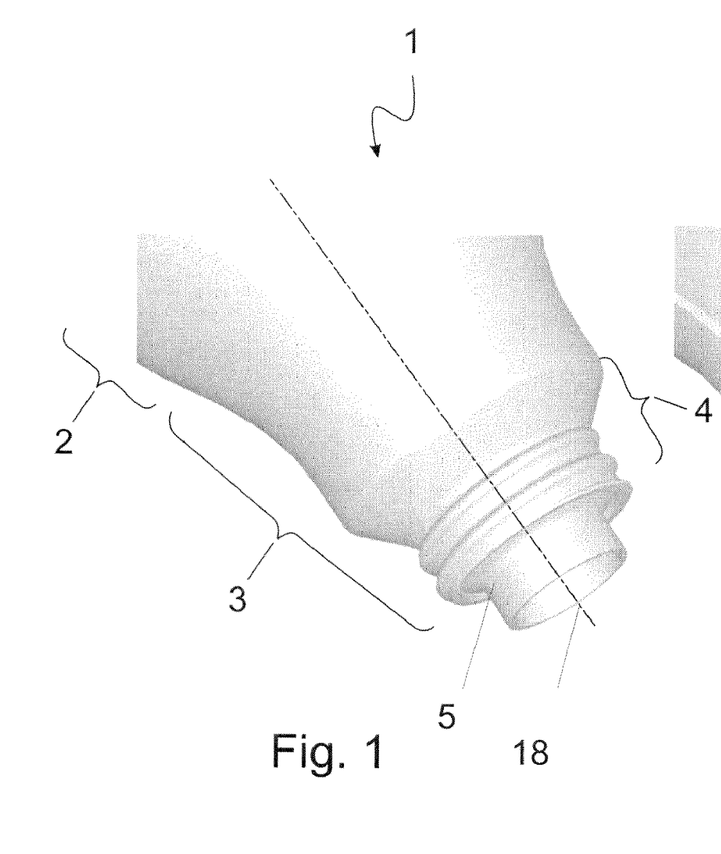
FIG. 1 is a perspective view of an outer envelope showing an elongated end section, a neck section and a neck-extension portion of the envelope.
Figure 2:
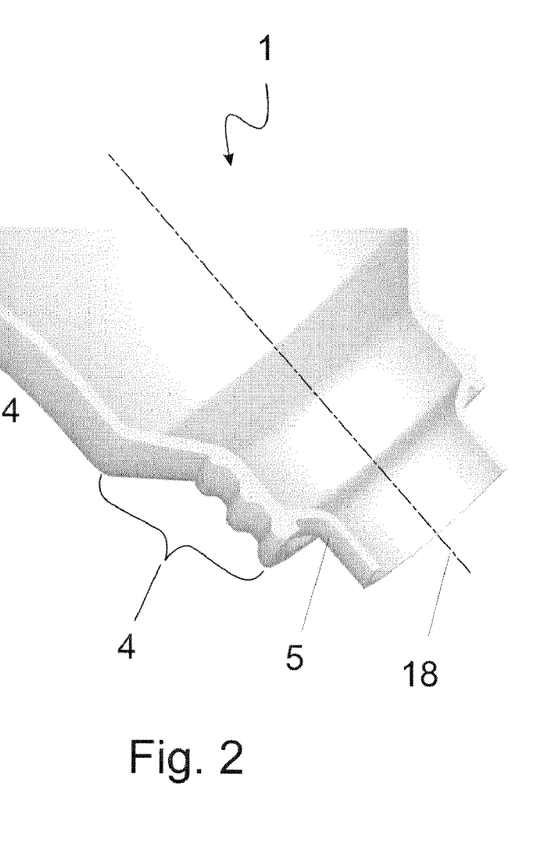
FIG. 2 is a perspective view of the outer envelope of FIG. 1 in a section made by a plane parallel with the principal axis of the envelope.
Figure 3:
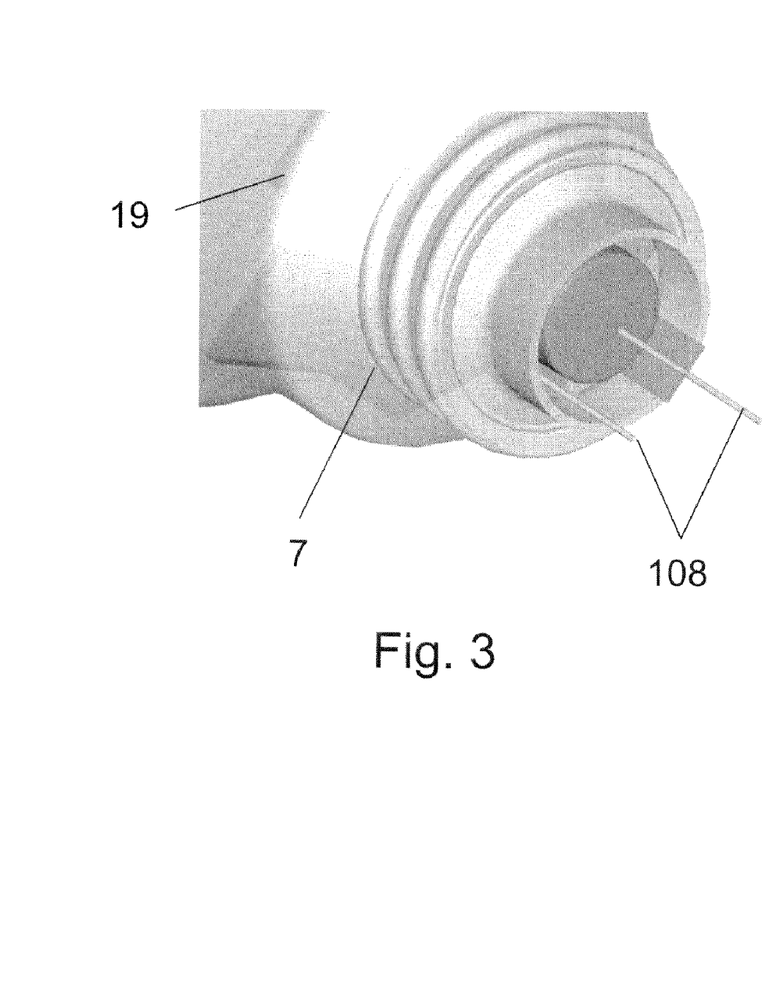
FIG. 3 is a perspective view of an elongated end section of the outer envelope with a ballast circuit mounted on printed circuit board (PCB), FIG. 4 a perspective view of a cross section of FIG. 3 made by a plane parallel with the principal axis of the envelope.
Figure 4:
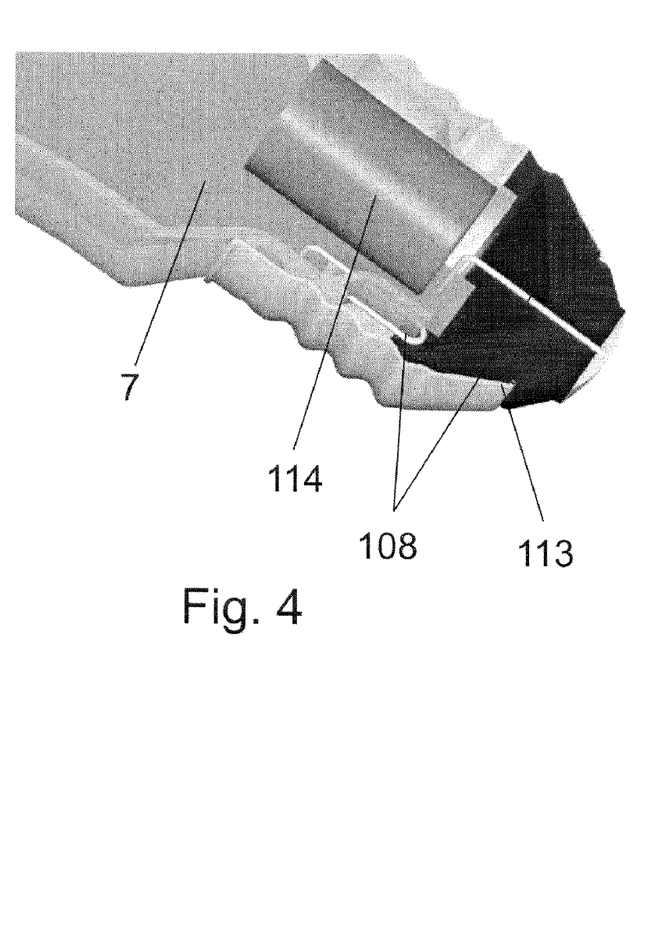
Figure 20:
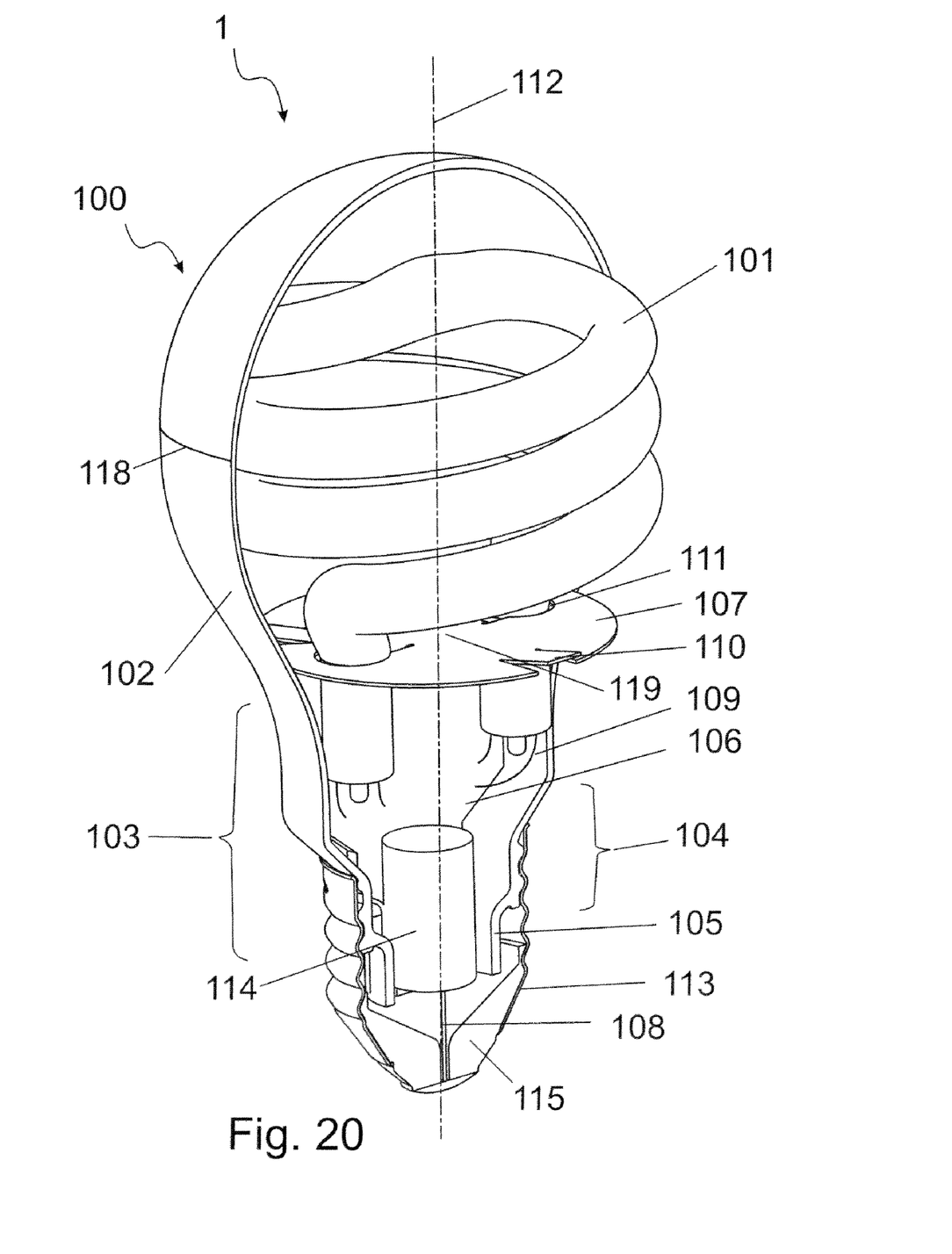
FIG. 20 is a perspective view of a compact fluorescent lamp mounted in a bulb-shaped outer envelope with neck-extension portion.

Referring now to FIGS. 1 and 2, a bulb-shaped outer envelope 1 is shown. The outer envelope comprises distinguishable sections: a substantially spherical section (only a small part thereof is shown in FIGS. 1 and 2, however depicted in its entirety in FIG. 20), an elongated end section 3, a neck section 4 within the elongated end section. The bulb-shaped outer envelope is suitable for accommodating at least one lamp that has a light-emitting body and a control gear. As shown in FIG. 20, in which a compact fluorescent lamp 100 with bulb-shaped outer envelope 1 can be seen, the light emitting body is a discharge tube arrangement 101 and the control gear is a ballast circuit 106. The spherical section 2 can receive the discharge tube arrangement, and the elongated end section 3 is suitable for accommodating at least a part of the components of the ballast circuit 106. The outer envelope is also provided with a neck-extension portion 5. This neck-extension portion 5 is substantially tubular, it may preferably be cylindrical or conical, and connects to an inner surface portion of the neck section by a conical section and protrudes from the neck section 4. As shown in FIGS. 3, 4 and 20, the neck-extension portion 5, or more closely, the inner space thereof can be exploited for accommodating a remaining part of the components of the ballast circuit 106. The components of the control gear or the ballast circuit 106 are electrical circuit components and a printed circuit board (PCB) 7 for mounting the electrical circuit components thereon.

The neck-extension portion 5 can be made of a same material as the material of the neck section 4, preferably of glass, or can be prepared of a material compatible with the material of the neck section 4. The neck section 4 for example may be of one type of glass or glass composition, and a compatible material of the neck-extension portion 5 can be another type of glass or glass composition. The neck-extension portion 5 simultaneously reinforces the neck section 4 by its conical section ensuring a circumferential support from inside.

The neck section 4 has a substantially cylindrical portion that widens out to a substantially conical portion. An outer surface portion of the neck section 4 is provided with threads, and a base 113 can be screwed on the neck section of the bulb-shaped outer envelope.

The substantially spherical section 2 and the elongated end section 3 of the outer envelope can be made of materials compatible with each other, for example of two different glass compositions, however it is also possible to prepare these two sections of the same material, i.e. identical glass compositions. The bulb-shaped outer envelope 1 can be designed to be of glass or plastic in its entirety, but the substantially spherical section 2 and a part of the elongated end section 3 can also be made of a material different from the material of a remaining part of the elongated end section 3, the neck section 4 and the neck-extension portion 5. The remaining part of the elongated end section 3, the neck section 4 and the neck-extension portion 5 can be made of the same material, preferably a plastic, or materials compatible with each other, for example of different plastic materials, while the substantially spherical section 2, and a part of the elongated end section 3 formed next to the substantially spherical section 2 can be manufactured of glass. The outer envelope with a glass bulb and a plastic housing in itself, similarly the various methods of fixing the glass bulb and the plastic housing to each other are known for a person skilled in the art.

Figure 5:
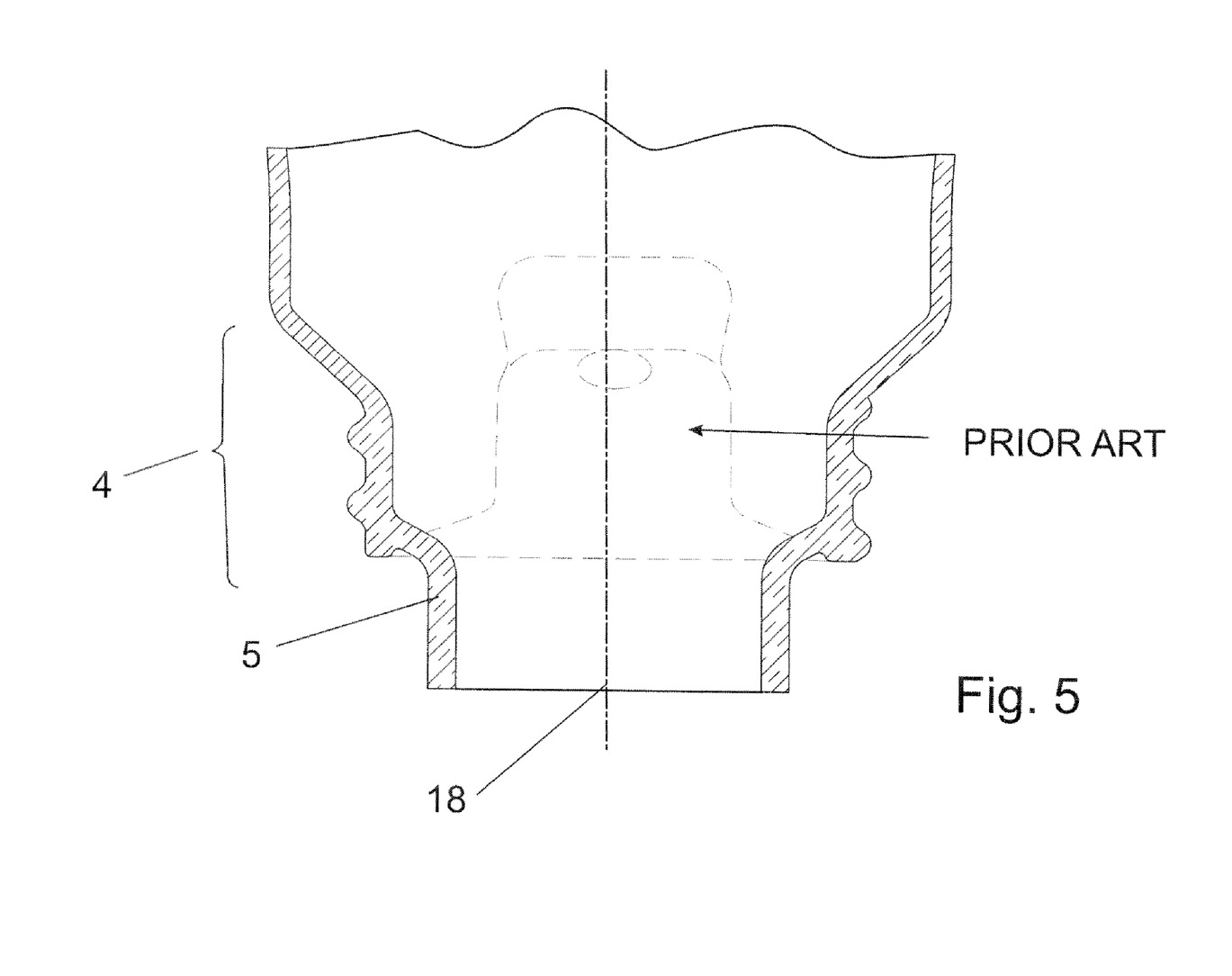
FIG. 5 is a cross section of the neck section and the neck-extension portion made by a plane containing the principal axis of the outer envelope.

FIG. 5 is a cross section of the elongated end section 3 made by a plane containing the principal axis of the outer envelope. A stem that is used in the manufacture of usual incandescent lamps is shown by broken line. This prior art stem or mount is prepared from a flare applied to a bulb-shaped envelope. A tubular upper portion of the flare is pinched to form a mount. The tubular lower flanged portion of the flare is melted to an inner surface portion of the neck section 4. An exemplary embodiment of the bulb-shaped outer envelope proposed comprises a neck-extension portion 5 instead of the stem. This neck-extension portion 5 is formed from a flare usual in the manufacture of incandescent lamps.

Figure 6:
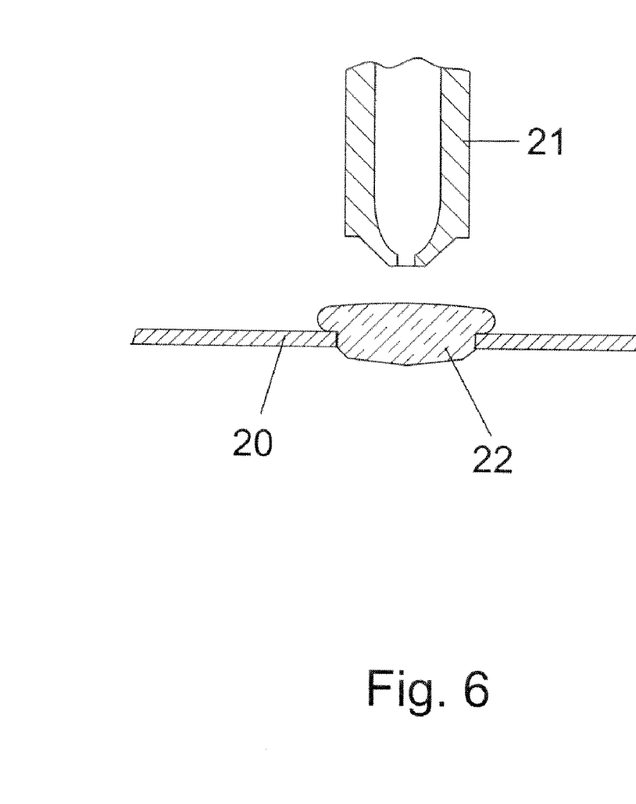
FIGS. 6-9 show the steps of manufacture of a prior art incandescent bulb.
Figure 7:
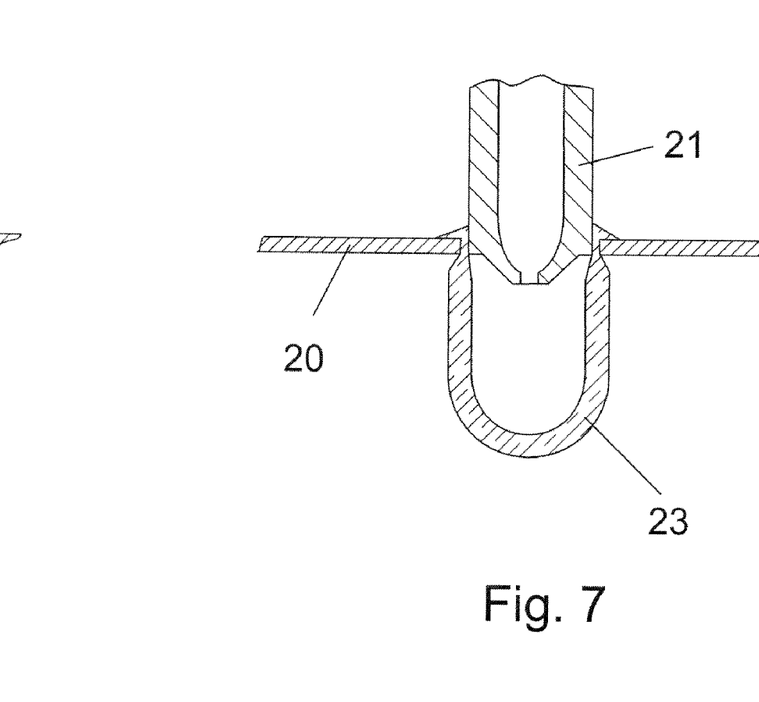
Figure 8:
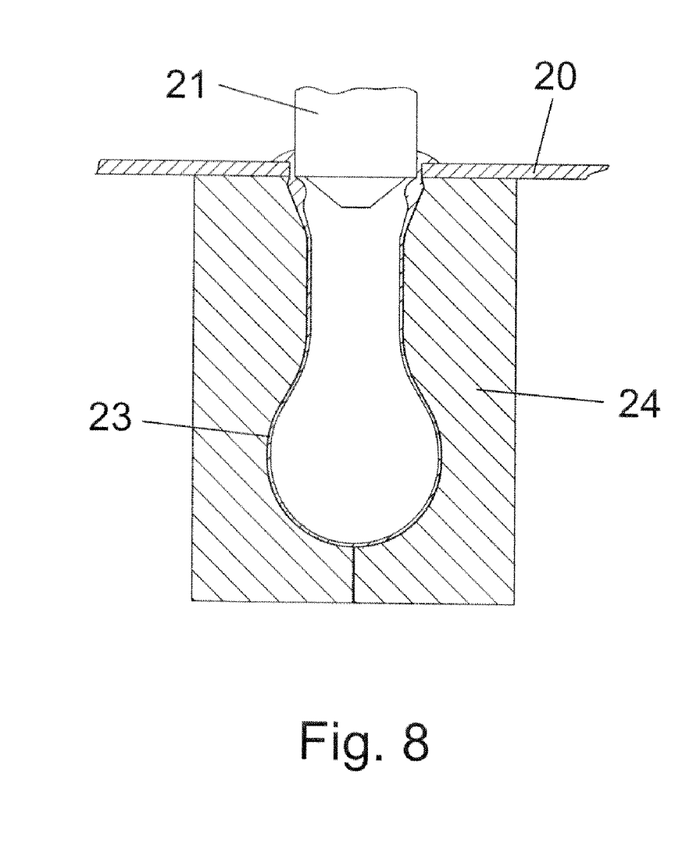
Figure 9:
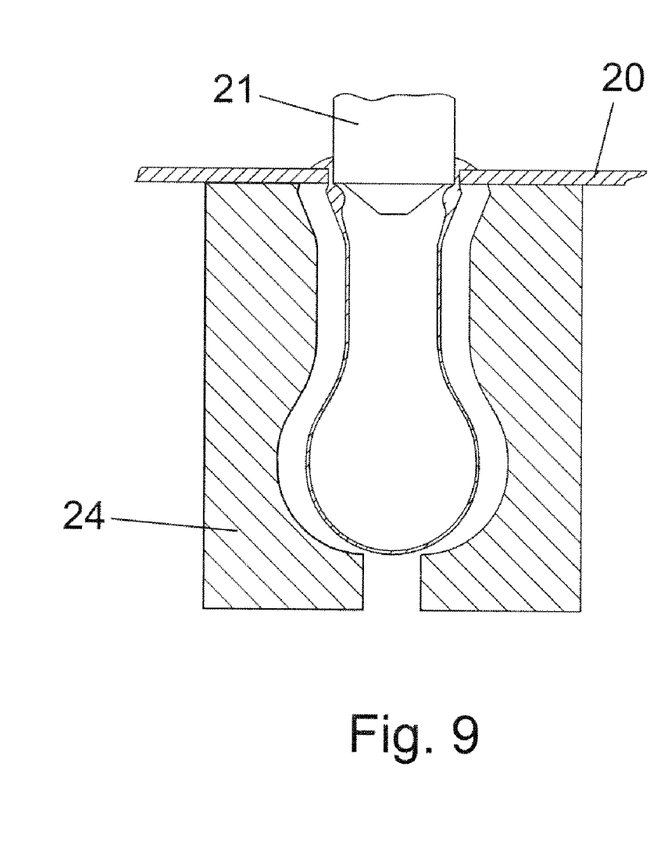

An exemplary method of substantially vertical manufacture of glass bulb-shaped outer envelopes 1 for lamps starts with providing a bulb-shaped envelope with a skirt section usual in the manufacture of incandescent lamps. As it is well known to a person skilled in the art with respect to the manufacture of incandescent lamps, the melted glass having flown out from an oven is flattened to band form by two cylinders positioned face to face to each other. The melted glass band flows onto a steel-plate. The steel-plate 20 has a hole in the middle thereof, and a jet 21 is displaced above the hole that is immersed in the melted glass as shown in FIGS. 6 and 7. Hot air is blown into the glass 22 through the jet 21 that results in a glass blister 23 (FIG. 7). A mold 24 consisting of two half-portions is closed around the blown up glass blister, and the blister 23 is pressed into the mold 24 by a further blow of air generating overpressure (FIG. 8). The mold 24 will be opened while the glass cools down (FIG. 9), and a bulb-shaped envelope with a skirt section will be produced. A mold that comprises a plurality of portions may also be used for this purpose. The last operation of producing a bulb-shaped envelope is an annealing of the glass material thereof.

Figure 10:
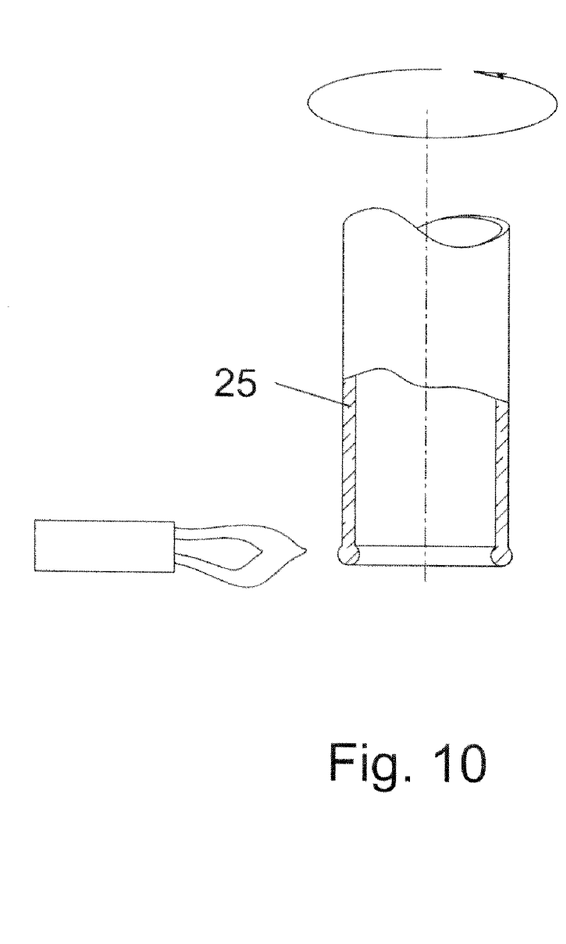
FIGS. 10-14 show the steps of manufacture of a prior art flare usual at incandescent bulbs.
Figure 11:
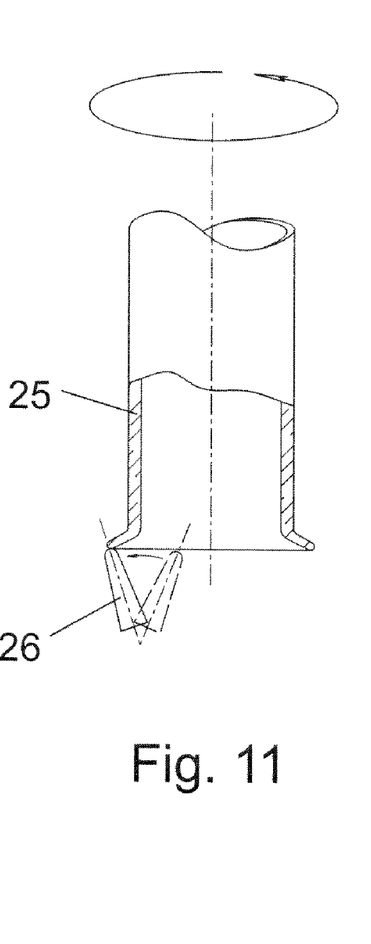
Figure 12:
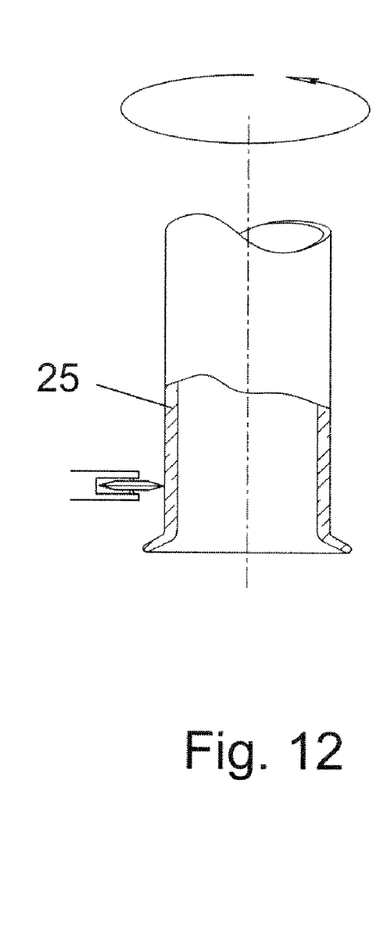
Figure 13:
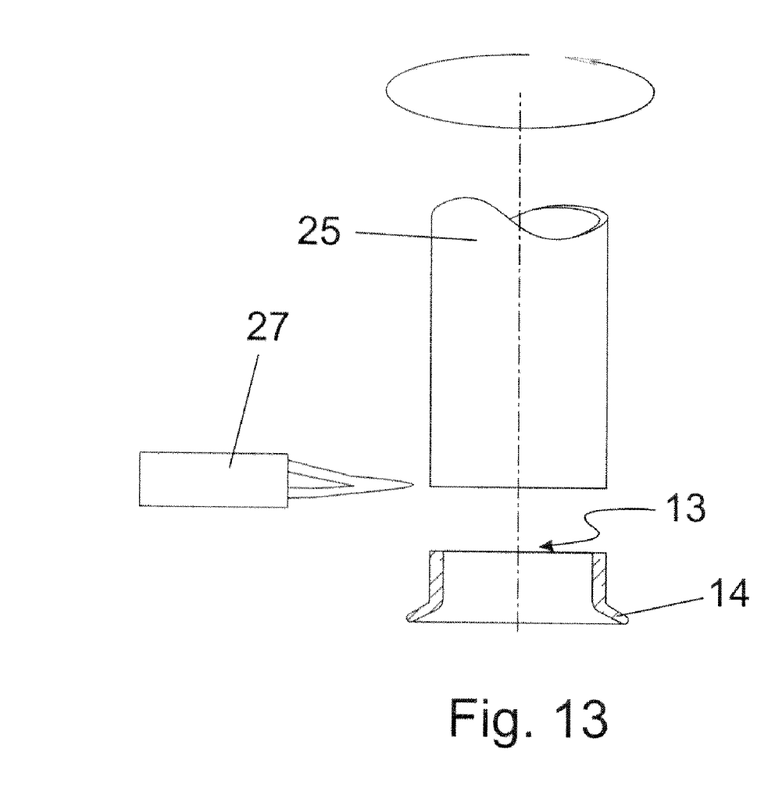
Figure 14:
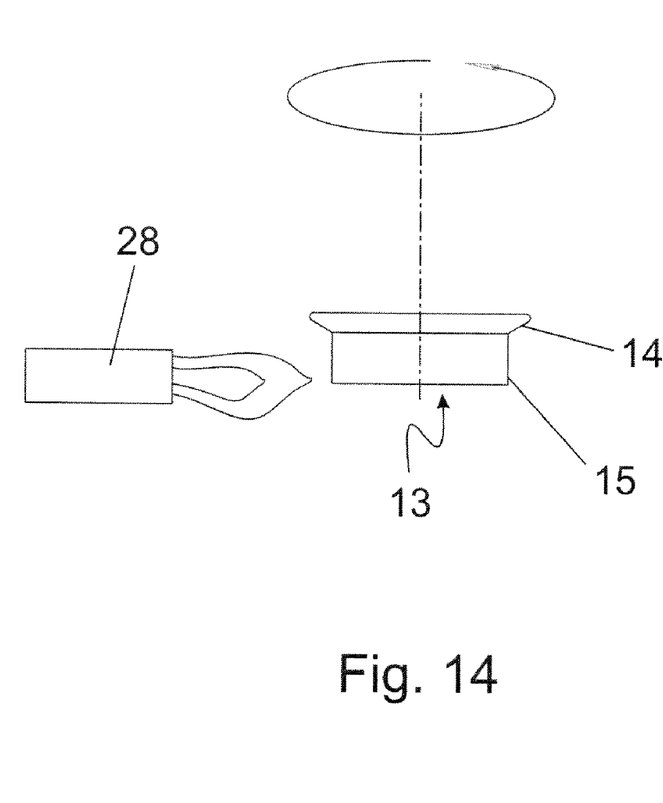

The next step of the manufacture of the bulb-shaped envelope is: providing a flare 13 with a tubular section 15 and a flanged section 14 usual in the manufacture of incandescent lamps. Although a person skilled in the art of incandescent glass technology is well aware of the manufacture of such flare, steps of production are briefly summarized referring to FIGS. 10-14. Starting with a tube 25 of a diameter of approximately 17 millimeters, an end portion of the tube 25 is melted by flame while the tube is rotated as shown by FIG. 10. A flange section is formed by a flange-making tool 26 (FIG. 11), subsequently a side portion of the tube is scratched (FIG. 12), and then the tube portion forming the flare with the tube section and the flanged section is split off by a stinging flame 27 (FIG. 13). An end portion of the tube section is brought to a trimmed final form by using a wide flame 28 (FIG. 14).

Figure 15:
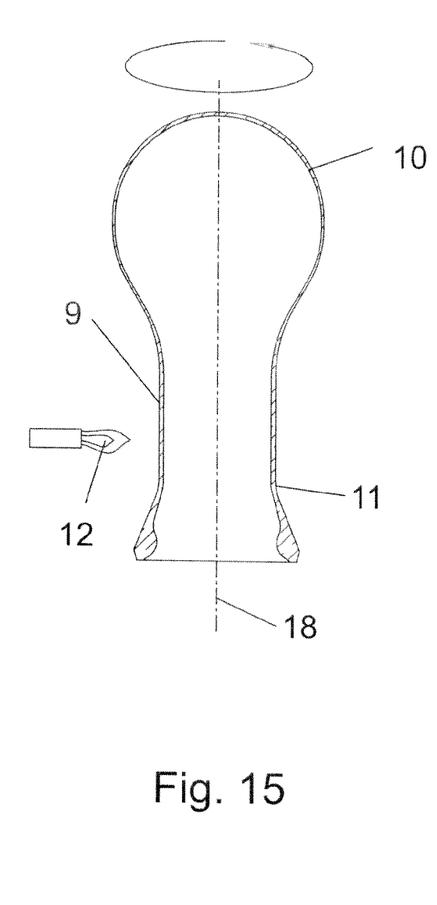
FIG. 15-19 show the steps of manufacture of an outer envelope with neck-extension portion.

In the exemplary method of manufacturing of the bulb-shaped outer envelope 1, the next step is a heating of a neck portion 9 of the envelope with a flame 12 while the skirt section is facing downward as shown in FIG. 15. The neck portion 9 includes the neck section 4 to be formed and vicinity thereof. While the neck portion 9 is being heated as well as throughout the entire method, the bulb-shaped outer envelope 1 is being rotated around a principal axis 18. Also, while heating the neck portion 9, the flare 13 is being lifted through the skirt section 11 into the neck portion 9 by a lifting rod 16. The position of the flare 13 will be substantially perpendicular to the principal axis 18 of the bulb-shaped envelope 10, and the tubular section 15 and the flanged section 14 thereof will face downward and upward, respectively. The position of the flare 13 is basically different from the position of a flare in manufacturing incandescent lamps where the tubular section faces upward and the flanged section faces downward in order that the tubular section is formed into a stem of the incandescent lamp. In the exemplary method of manufacturing the bulb-shaped outer envelope for lamps, the tubular section 15 of the flare 13 faces downward so that a neck-extension portion 5 comes into being.

Figure 16:
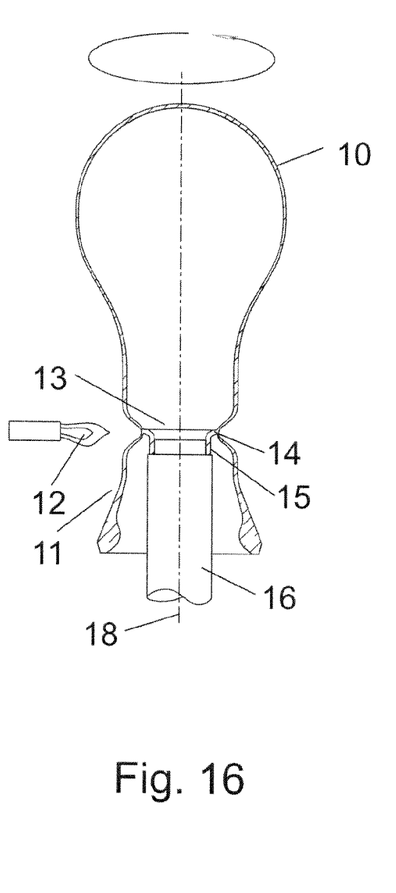
Figure 17:
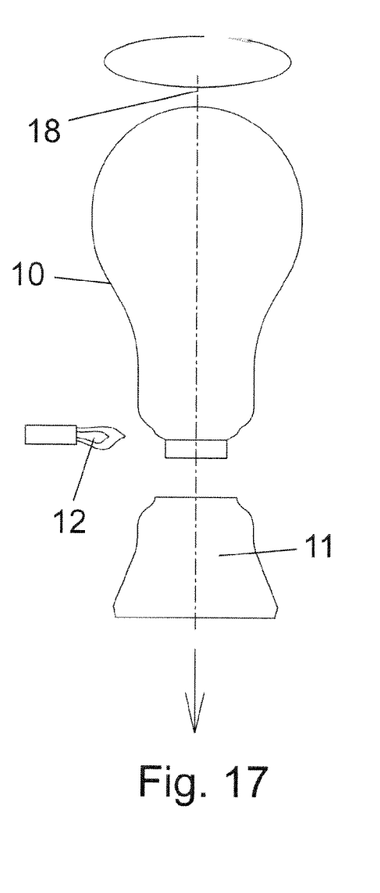

Subsequently, the glass of the neck section is being melted until the skirt section 11 drops and an inner surface portion of the neck section 4 of the envelope 10 melts onto the flanged section 14 of the flare 13, as depicted in FIG. 16. The next step is: closing a mold 17 around the flare 13 and at least a portion of the neck section 4. The mold 17 consists of two half-portions that are closable with respect to each other, and have inner surfaces that are suitable for forming the neck section 4 and the flare 13 in a desired shape. A mold that comprises a plurality of portions may also be used. The inner surface portion of the mold 17 can be provided with threads for forming at least a part of the neck section 4, and another inner surface portion of this mold can be substantially conical for forming a section of the neck-extension portion 5. The bulb-shaped envelope 10, providing of which forms a starting point of the exemplary method of manufacturing, may have a wall thickness 5-10% larger than a wall thickness of a neck section usual in incandescent lamps in order that sufficient glass material be present for forming the threads of the neck section 4. The wall thickness of a neck section usual in incandescent lamps is in the range of 0.5-0.6 millimeters, as it is known to a person skilled in the art of manufacture of incandescent lamps. More preferably, this wall thickness may be 7-9% larger than a wall thickness of a neck section of an incandescent lamp.

Figure 18:
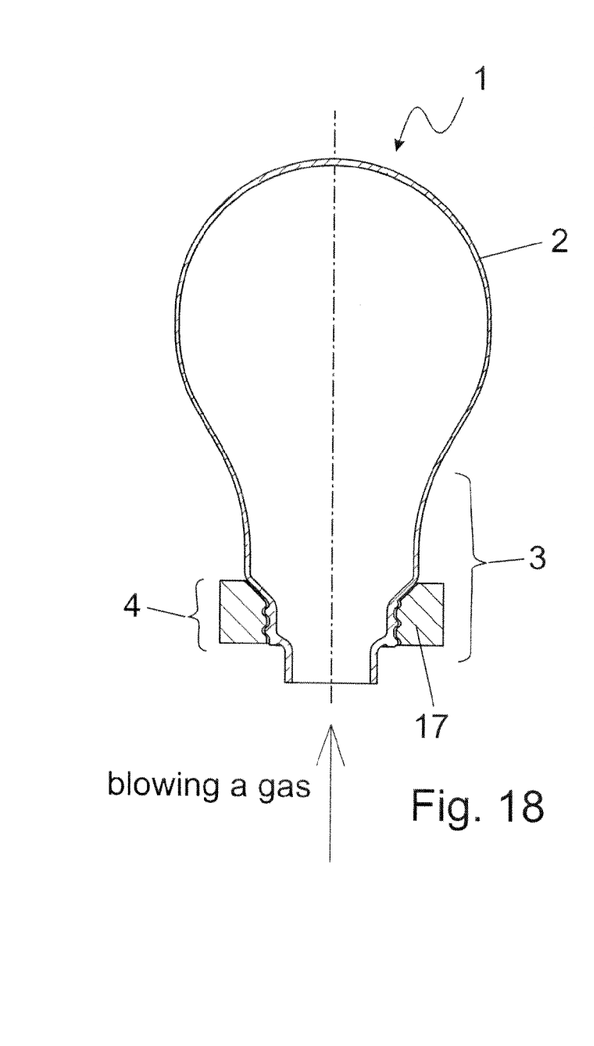
Figure 19:
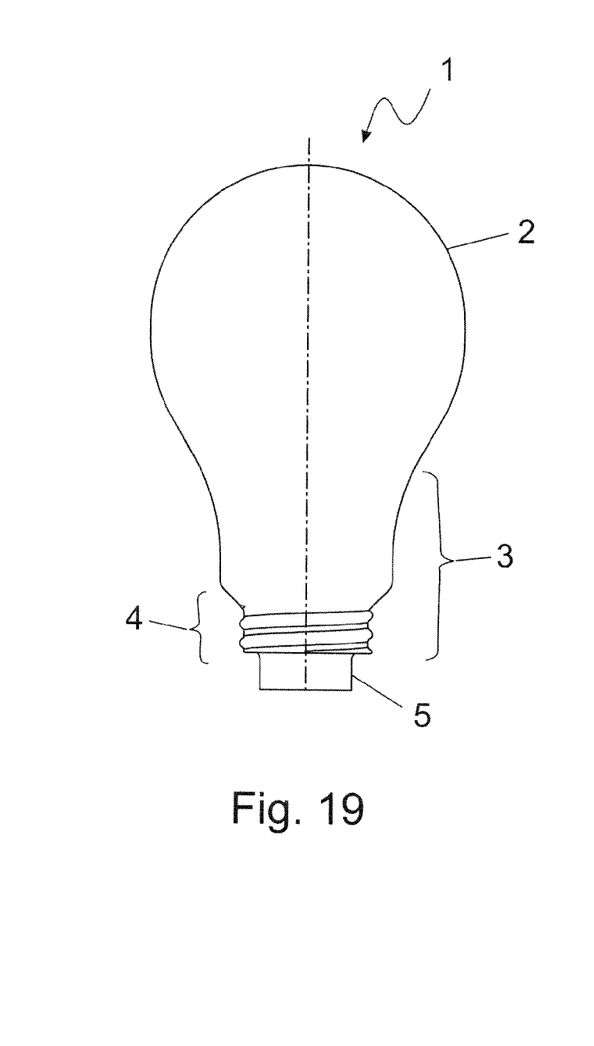

Referring now to FIG. 18, a gas, preferably air, is being blown through the neck-extension portion 5 into the envelope while the mold is in closed position and the flame of heating 12 is being removed. The blown gas makes overpressure within the envelope 1 so that the melted glass of the envelope fills out the mold and subsequently cools down. After removing the mold 17 as shown by FIG. 19, an annealing step completes the method of manufacture of the bulb-shaped outer envelope 1.

A compact fluorescent lamp 100 with a bulb-shaped outer envelope 1 is an exemplary embodiment of a further aspect of this invention (FIG. 20). The compact fluorescent lamp includes a discharge tube arrangement 101 with at least one discharge tube, a ballast circuit 106 for controlling current in the tube and a bulb-shaped outer envelope 1 that has a neck-extension portion 105 having already been described above. The discharge tube, well known for a person skilled in the art, encloses a discharge volume filled with a discharge gas, and has a fluorescent phosphor coating disposed on the inner surface thereof. The tube forms a continuous arc path and is provided with electrodes disposed at each end of the arc path. The discharge tube arrangement 101 of FIG. 20 is a helical arrangement, but may be a multi-finger arrangement as well. The multi-finger arrangement is also known for a person skilled in the art: this arrangement is built of substantially straight tube sections bent to a U-shape with the bent sections forming suitable domes. Bridge sections to bring about the continuous arc path connect the U-shaped tube sections.

The bulb-shaped outer envelope 1 has a substantially spherical section 102 that encloses the discharge tube arrangement 101, which is supported by a holder plate 107. The holder plate 107 is preferably made of a metal, but a plastic holder plate may also be used. The holder plate 107 has a circumferential edge portion provided with springy tabs 110 cut out of the material thereof. The springy tabs 110 lean against an inner surface portion of the outer envelope 1, and also press the discharge tube arrangement 101 to an upper inner surface portion of the spherical section 102. The holder plate 107 receives the discharge tube arrangement 101 by holes 111.

The bulb-shaped outer envelope 1 also includes an elongated end section 103 that encloses at least a part of the ballast circuit components. The ballast circuit components comprise a printed circuit board and electrical circuit elements, such as transistors, diodes, transformers, inductors, capacitors, resistors etc. The embodiment of the compact fluorescent lamp 100 contains a ballast circuit that has a printed circuit board mounted substantially parallel with the principal axis 112. As seen in FIG. 3, the printed circuit board 7 has a tab 19 that connects to the holder plate 107 (FIG. 20) through a slot 119. The elongated end section 103 also has a substantially cylindrical neck section 104 for receiving and fixing a base 113 on an outer surface portion thereof. The exemplary embodiment of the compact fluorescent lamp 100 shown in FIG. 20 has a substantially cylindrical neck section 104, the outer surface portion of which is provided with threads and the base is screwed thereon.

As indicated above, the bulb-shaped outer envelope 1 also has a substantially tubular neck-extension portion 105. The neck-extension portion 105 connects to an inner surface portion of and protrudes from the neck section 104 and provides a space for accommodating a part of the ballast circuit components, for example a capacitor 114. The printed circuit board 7 with its narrowing lower portion extends into the space formed by the neck-extension portion 105. This space is insulated from the base 113 by a wall of the neck-extension portion 105, which simultaneously provides for reinforcing an end portion of the neck section 104 of the bulb-shaped outer envelope 1. The exemplary embodiment of the compact fluorescent lamp of FIG. 20 is illustrative with respect to the advantageous exploitation of the inner space of the outer envelope 1 due to the neck-extension portion 105.

The ballast circuit 106 is provided with lead-in wires 109 and lead-out wires 108. The lead-out wires 108 are led through the substantially tubular neck-extension portion 105, which is better seen in FIG. 4. The lead-out wires 108 are terminated in the base 113 and insulated from each other by an insulating portion 115 in order to ensure connection to two terminals of an associated power supply. The lead-in wires 109 connect to the discharge tube arrangement 101.

The bulb-shaped outer envelope 1 of the exemplary compact fluorescent lamp has a separation line 118, along which the envelope is divided into two suitable sections that allow the discharge tube arrangement 101 and the ballast circuit components to be put into the outer envelope 1 and the two sections subsequently are melted together.

The invention is not limited to the shown and disclosed embodiments, but other elements, improvements and variations are also within the scope of the invention. For example, it is clear for those skilled in the art that the bulb-shaped outer envelope with the neck-extension portion may enclose light-emitting bodies of different types, e.g. halogen ones or light-emitting diodes. Similarly, the bulb-shaped outer envelope may accommodate a combination of light-emitting bodies, such as a compact fluorescent discharge tube arrangement in combination with light-emitting diodes or a compact fluorescent discharge tube arrangement in combination with a halogen light-emitting body, i.e. a halogen lamp in short. Also, the control gear may be compact fluorescent ballast, control circuit for a light-emitting diode or a halogen lamp as well as combination of these circuits.

The invention claimed is:

1. A bulb-shaped outer envelope for accommodating at least one lamp including a light-emitting body and a control gear with components, the envelope comprising:
    a substantially spherical section for receiving the light-emitting body;
    an elongated end section extending along a longitudinal axis from the substantially spherical section for receiving at least a part of the components of the control gear, the elongated end section having a neck section; and
    a substantially tubular neck-extension portion having an open end and connecting to an inner surface portion of and protruding from the neck section over an axial dimension that completely receives at least a remaining part of the components of the control gear and reinforces the neck section.

2. The bulb-shaped outer envelope of claim 1, in which the substantially spherical section and the elongated end section are made of a same material.

3. The bulb-shaped outer envelope of claim 1, in which the substantially spherical section and the elongated end section are made of materials compatible with each other.

4. The bulb-shaped outer envelope of claim 1, in which the neck-extension portion is made of a material same as the material of the neck section.

5. The bulb-shaped outer envelope of claim 1, in which the neck-extension portion is made of a material compatible with the material of the neck section.

6. The bulb-shaped outer envelope of claim 1, in which the neck-extension portion is substantially cylindrical.

7. The bulb-shaped outer envelope of claim 1, in which the neck-extension portion is substantially conical.

8. The bulb-shaped outer envelope of claim 1, in which the neck-extension portion has a substantially conical section.

9. The bulb-shaped outer envelope of claim 1, in which the neck section comprises a substantially conical portion and a substantially cylindrical portion.

10. The bulb-shaped outer envelope of claim 1, in which the neck section has a cylindrical portion with threads on an outer surface portion thereof.

11. The bulb-shaped outer envelope of claim 1, in which the substantially spherical section and a part of the elongated end section are made of a material different from the material of a remaining part of the elongated end section, the neck section and the neck-extension portion, while a remaining part of the elongated end section, the neck section and the neck-extension portion are made of materials compatible with each other.

12. The bulb-shaped outer envelope of claim 1, in which the material thereof is glass.

13. The bulb-shaped outer envelope of claim 1, in which the material thereof is plastic.

14. The bulb-shaped outer envelope of claim 1, wherein the tubular neck-extension portion has a smaller diameter than the neck section.

15. A compact fluorescent lamp comprising:
    a discharge tube arrangement being formed of at least one discharge tube enclosing a discharge volume filled with a discharge gas and having a fluorescent phosphor coating disposed on the inner surface of the tube, the tube forming a continuous arc path and further being provided with electrodes disposed at each end of the arc path;
    a ballast circuit for controlling current in the tube and being connected to the electrodes and an associated power supply; and
    a bulb-shaped outer envelope comprising:
        a substantially spherical section enclosing the discharge tube arrangement; and
        an elongated end section comprising an identical composition as the spherical section and enclosing at least a part of the ballast circuit components, the elongated end section having a substantially cylindrical neck section provided with an outer surface suitable for receiving and fixing a base such that the base is connected to the neck section wherein the neck section may comprise a different material than the spherical section and the elongated end section; and
        a substantially tubular neck-extension portion connecting to an inner surface portion of and protruding from the neck section, and providing space for accommodating at least a remaining part of the ballast circuit components.

16. The compact fluorescent lamp of claim 15, in which the discharge tube arrangement is a helical arrangement.

17. The compact fluorescent lamp of claim 15, in which the discharge tube arrangement is a multi-finger arrangement.

18. The compact fluorescent lamp of claim 15, in which the bulb-shaped outer envelope has a separation line, along which the envelope is divided into two sections allowing the discharge tube arrangement and the ballast circuit components to be put into the envelope and the two sections subsequently are melted together.

19. The compact fluorescent lamp of claim 15, in which the outer surface portion of the substantially cylindrical neck section is provided with threads and the base is screwed thereon.

20. The compact fluorescent lamp of claim 15, in which lead-out wires of the ballast circuit are led through the neck-extension portion and terminated in the base to ensure connection to the associated power supply.

21. The bulb shaped outer envelope of claim 15, wherein the tubular neck-extension portion has a smaller diameter than the neck section.

* * * * *